N. ROUTZAHN.
Churn.
No. 7,199.
Patented March 19, 1850.
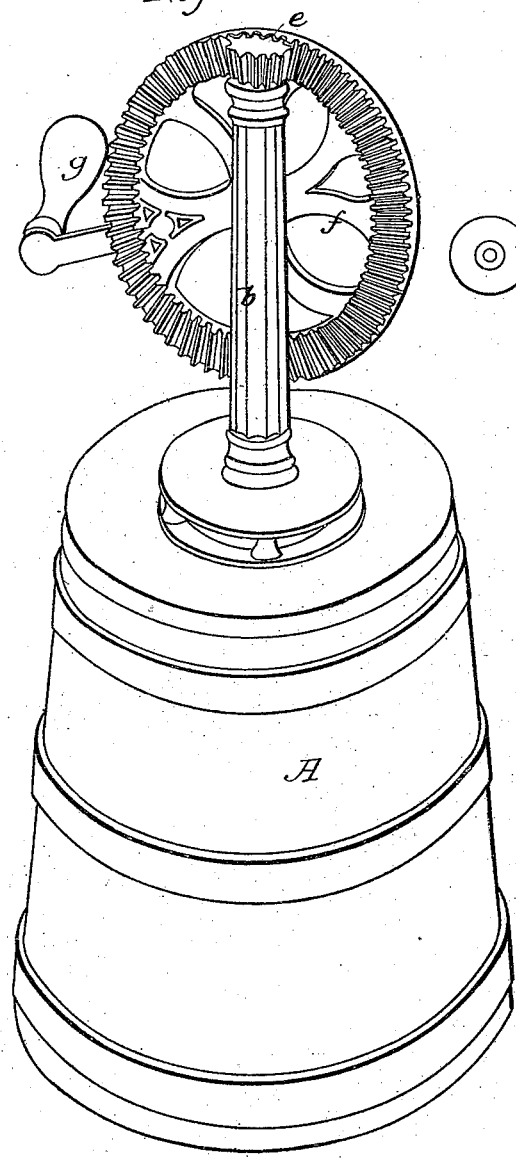
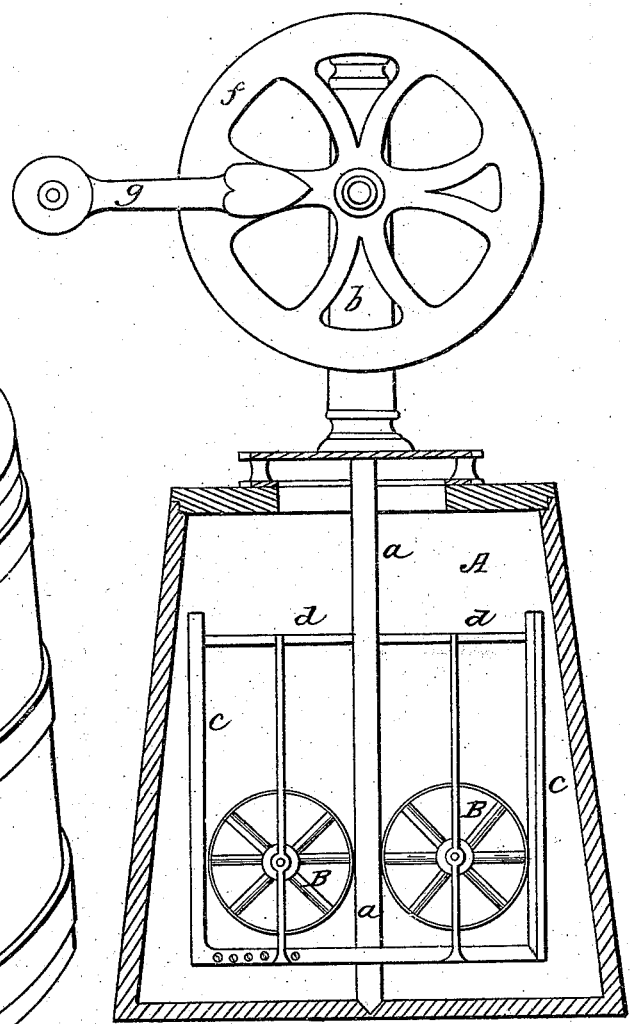

UNITED STATES PATENT OFFICE.

N. ROUTZAHN, OF MIDDLETOWN, MARYLAND.

CHURN-DASHER.

Specification of Letters Patent No. 7,199, dated March 19, 1850.

*To all whom it may concern:*

Be it known that I, NATHANIEL ROUTZAHN, of Middletown, in the county of Frederick and State of Maryland, have invented a new and useful Improvement in Churns, of which the following is a full, clear, and exact description, reference being had to the accompanying drawing, which forms part of this specification and in which—

Figure 1 is a representation in perspective of my churn, and Fig. 2 is a view of it with half the tub removed to show the construction of the dasher.

In the drawing A, is the churn tub, and $a$, a vertical spindle resting in a step on the bottom of the churn, and having its upper extremity supported by a standard, $b$, secured to the cover of the churn tub. This spindle forms the axis of the dasher, the latter is formed of two L shaped tubes $c$, $c$, having a triangular cross section, these commencing on opposite sides of the axis at a short distance from the cover of the churn extend downward to within a short distance of the bottom of the tub, where they are turned inward and united with the axis. The horizontal arms of these tubes are perforated with holes through which air enters the milk during the revolution of the dasher; the upper extremities of the tubes are connected with each other and with the axis, $a$, by a horizontal bar $d$. Between the upright arm of each tube and the axis standards are erected to which whirls B, or wheels having inclined spokes are pivoted; these wheels are arranged to turn freely on their pivots in planes passing through the axis of the dasher. A beveled pinion $e$ is secured to the upper extremity of the axis $a$ and gears into a beveled wheel, $f$, whose axis is supported by the standard, $b$, and to which a rotary motion is imparted by means of a crank, $g$, secured to it. The dasher thus receives a rapid rotating motion, and the whirls in passing through the milk are rapidly turned by its pressure upon the inclined faces of their arms which reacting upon the milk through which they pass, subdivides the whole map and puts it in violent agitation, during which air is supplied through the outer tubes. The friction thus produced by the whirls greatly facilitates the separation of the butter.

I have thus far described the dasher as put in motion by a beveled wheel and pinion, but I do not wish to limit myself to this particular device as a belt running on pulleys, or an ordinary cog wheel and pinion can be used for the same purpose.

What I claim in the foregoing as my invention and desire to secure by Letters Patent is—

The combination of the whirls with the revolving frame dasher, the several members being arranged and constructed substantially in the manner herein set forth.

In testimony whereof I have hereunto subscribed my name this first day of November 1869.

NATHANIEL ROUTZAHN.

Witnesses:
S. W. WOOD,
T. H. WATSON.